United States Patent
Kawano et al.

(10) Patent No.: US 8,000,064 B2
(45) Date of Patent: Aug. 16, 2011

(54) THIN-FILM MAGNETIC HEAD FOR PERPENDICULAR MAGNETIC RECORDING AND METHOD OF MAKING THE SAME

(75) Inventors: Hidetaka Kawano, Tokyo (JP); Hiromichi Umehara, Tokyo (JP); Takamitsu Sakamoto, Tokyo (JP); Koichi Otani, Tokyo (JP); Noriaki Kasahara, Tokyo (JP); Naoto Matono, Saku (JP)

(73) Assignees: TDK Corporation, Tokyo (JP); SAE Magnetics (H.K.) Ltd., Hong Kong (HK)

( * ) Notice: Subject to any disclaimer, the term of this patent is extended or adjusted under 35 U.S.C. 154(b) by 852 days.

(21) Appl. No.: 12/000,519

(22) Filed: Dec. 13, 2007

(65) Prior Publication Data

US 2009/0273863 A1 Nov. 5, 2009

(51) Int. Cl.
G11B 5/11 (2006.01)
H04R 31/00 (2006.01)
(52) U.S. Cl. ............ 360/319; 29/603.07; 29/603.2
(58) Field of Classification Search ............ 360/125.02, 360/125.14, 125.3, 320, 319; 29/603.07, 29/603.2
See application file for complete search history.

(56) References Cited

U.S. PATENT DOCUMENTS

| | | | |
|---|---|---|---|
| 4,656,546 A | 4/1987 | Mallory | |
| 4,935,832 A * | 6/1990 | Das et al. | 360/112 |
| 6,954,340 B2 | 10/2005 | Shukh et al. | |
| 7,042,682 B2 | 5/2006 | Hu et al. | |
| 7,450,349 B2 * | 11/2008 | Nishida et al. | 360/319 |
| 7,872,835 B2 * | 1/2011 | Guan | 360/319 |
| 2005/0141137 A1 | 6/2005 | Okada et al. | |
| 2006/0119984 A1 * | 6/2006 | Nishida et al. | 360/128 |
| 2006/0171068 A1 * | 8/2006 | Taguchi | 360/125 |
| 2008/0253035 A1 * | 10/2008 | Han et al. | 360/319 |
| 2008/0273276 A1 * | 11/2008 | Guan | 360/319 |
| 2008/0273277 A1 * | 11/2008 | Guan et al. | 360/319 |
| 2009/0091861 A1 * | 4/2009 | Takano et al. | 360/319 |

FOREIGN PATENT DOCUMENTS

| | | | |
|---|---|---|---|
| JP | A 2004-127480 | | 4/2004 |
| JP | A 2005-190518 | | 7/2005 |
| JP | 2006164356 A | * | 6/2006 |
| JP | 2006209927 A | * | 8/2006 |

* cited by examiner

Primary Examiner — Julie Anne Watko
(74) Attorney, Agent, or Firm — Oliff & Berridge, PLC

(57) ABSTRACT

A perpendicular recording thin-film magnetic head comprises a main magnetic pole having a tip main magnetic pole part extending in a height direction from a medium-opposing surface and a base main magnetic pole part connected to the tip main magnetic pole part on a side opposite from the medium-opposing surface side and wider than the tip main magnetic pole part in a track width direction; a return yoke extending in the height direction from the medium-opposing surface and magnetically coupling with the base main magnetic pole part at a position distanced from the medium-opposing surface in the height direction, while opposing the tip main magnetic pole part through a write gap layer in a bit length direction in the medium-opposing surface; and a main magnetic pole adjacent magnetic shield layer extending along at least part of side faces of the main magnetic pole other than the medium-opposing surface as seen in a laminating direction, while holding a nonmagnetic layer between the main magnetic pole and the main magnetic pole adjacent magnetic shield layer.

9 Claims, 17 Drawing Sheets

THIN-FILM MAGNETIC HEAD FOR PERPENDICULAR MAGNETIC RECORDING AND METHOD OF MAKING THE SAME

BACKGROUND OF THE INVENTION

1. Field of the Invention

The present invention relates to a perpendicular recording thin-film magnetic head and a method of manufacturing the same.

2. Related Background Art

As hard disk drives, those of in-plane recording type in which a recording layer of a magnetic recording medium is magnetized in its in-plane direction so as to effect magnetic recording have already been in widespread use. For achieving a higher recording density, attention has been directed to perpendicular recording hard disk drives which perform magnetic recording by magnetizing a recording layer of a magnetic recording medium in a direction orthogonal to its in-plane direction. The perpendicular recording scheme has been considered advantageous over the in-plane recording scheme in achieving hard disk drives having a high recording density, since it can increase the volume per bit of a magnetic material constituting the recording layer of the magnetic recording medium, for example.

A perpendicular recording thin-film magnetic head employed in the perpendicular recording scheme comprises a main magnetic pole which emits a magnetic flux from a medium-opposing surface to a magnetic recording medium, and a return yoke into which the magnetic flux having magnetized the medium after being emitted from the main magnetic pole flows. The main magnetic pole has a sharpened tip part exposed at the medium-opposing surface and a base part which is wider than the tip part. Since the magnetic flux pumped by a coil layer so as to pass through the base part is concentrated at the tip part of the main magnetic pole, the main magnetic pole can emit a strong magnetic flux toward the magnetic recording medium. The magnetic flux emitted from the main magnetic pole passes perpendicularly through the recording layer so as to be drawn to a soft magnetic backing layer under the recording layer of the magnetic recording medium, thereby magnetizing the recording layer perpendicularly. The magnetic flux transmitted through the recording layer passes the soft magnetic backing layer in its in-plane direction and then perpendicularly through the recording layer again, so as to flow into the return yoke. Thus, the main magnetic pole, soft magnetic backing layer, and return yoke construct a magnetic circuit, whereby the perpendicular recording thin-film magnetic head performs perpendicular magnetic recording onto the magnetic recording medium.

For improving the recording performance by such a perpendicular recording thin-film magnetic head, it is necessary to restrain a phenomenon known as side erase from occurring. The side erase is a phenomenon in which, at the time of magnetic recording, information recorded on a track adjacent to a track to be recorded in a magnetic recording medium is erased unintentionally. This phenomenon occurs because magnetic fluxes are emitted from side faces of the tip part or side faces of the base part in the main magnetic pole toward tracks adjacent to the track to be recorded, for example. For suppressing such occurrence of side erase, perpendicular recording thin-film magnetic heads equipped with a side shield which is a magnetic shield layer arranged along the medium-opposing surface so as to hold the tip part of the main magnetic pole in the track width direction have been known (see Japanese Patent Application Laid-Open Nos. 2004-127480 and 2005-190518 and U.S. Pat. Nos. 4,656,546, 4,935,832, 6,954,340, and 7,042,682). The side shield absorbs, among magnetic fluxes emitted from the main magnetic pole, those emitted toward tracks adjacent to the track to be recorded, so as to restrain the side erase from occurring, whereby the track density can be improved.

However, there have been cases where the conventional perpendicular recording thin-film magnetic heads equipped with the side shield fail to fully absorb the magnetic fluxes emitted from the main magnetic pole toward tracks adjacent to the track to be recorded in the magnetic recording medium and thus cannot fully suppress the occurrence of side erase. For achieving a perpendicular recording thin-film magnetic head adapted to a high recording density, it is necessary to reduce the throat height, which is the height of the tip part of the main magnetic pole, in particular. When the throat height is made smaller, the distance from the side faces of the base part of the main magnetic pole to the magnetic recording medium becomes shorter, which makes it more difficult for the side shield to fully absorb the magnetic fluxes emitted from the side faces of the main magnetic pole toward tracks adjacent to the track to be recorded in the magnetic recording medium, whereby the occurrence of side erase is hard to suppress sufficiently.

In view of such a problem, it is an object of the present invention to provide a perpendicular recording thin-film magnetic head which can fully suppress the occurrence of side erase, and a method of manufacturing the same.

SUMMARY OF THE INVENTION

The perpendicular recording thin-film magnetic head in accordance with the present invention comprises a main magnetic pole having a tip main magnetic pole part extending in a height direction from a medium-opposing surface and a base main magnetic pole part connected to the tip main magnetic pole part on a side opposite from the medium-opposing surface side and wider than the tip main magnetic pole part in a track width direction; a return yoke extending in the height direction from the medium-opposing surface and magnetically coupling with the base main magnetic pole part at a position distanced from the medium-opposing surface in the height direction, while opposing the tip main magnetic pole part through a write gap layer in a bit length direction in the medium-opposing surface; and a main magnetic pole adjacent magnetic shield layer extending along at least part of side faces of the main magnetic pole other than the medium-opposing surface as seen in a laminating direction, while holding a nonmagnetic layer between the main magnetic pole and the main magnetic pole adjacent magnetic shield layer.

In the perpendicular recording thin-film magnetic head in accordance with the present invention, when emitting magnetic fluxes from the main magnetic pole toward a magnetic recording medium for writing onto the magnetic recording medium, at least part of magnetic fluxes emitted from the side faces of the main magnetic pole other than the medium-opposing surface as seen in the laminating direction are absorbed by the main magnetic pole adjacent magnetic shield layer arranged so as to extend along the main magnetic pole. The magnetic fluxes emitted from the side faces of the main magnetic pole other than the medium-opposing surface may reach tracks adjacent to the track to be recorded in the magnetic recording medium if not for the main magnetic pole adjacent magnetic shield layer. Therefore, using the perpendicular recording thin-film magnetic head in accordance with the present invention reduces the magnetic fluxes emitted toward tracks adjacent to the track to be recorded in the magnetic recording medium at the time of writing onto the magnetic recording medium, whereby a perpendicular recording thin-film magnetic head suppressing the occurrence of side erase is obtained.

Preferably, the main magnetic pole adjacent magnetic shield layer extends along at least a side face of the tip main magnetic pole part in the side faces of the main magnetic pole other than the medium-opposing surface.

As a consequence, magnetic fluxes emitted from side faces of the tip main magnetic pole part toward tracks adjacent to the track to be recorded in the magnetic recording medium are absorbed by the main magnetic pole adjacent magnetic shield layer. Since the side faces of the tip main magnetic pole part in the side faces of the main magnetic pole other than the medium-opposing surface are located closer to the magnetic recording medium, the magnetic fluxes emitted from the side faces of the tip main magnetic pole part will be likely to cause the side erase in particular if not for the main magnetic pole adjacent magnetic shield layer. Therefore, providing the main magnetic pole adjacent magnetic shield layer at such a position yields a perpendicular recording thin-film magnetic head further suppressing the occurrence of side erase.

Preferably, the main magnetic pole adjacent magnetic-shield layer extends along at least the side face of the tip main magnetic pole part and a side face of the base main magnetic pole part on the medium-opposing surface side in the side faces of the main magnetic pole other than the medium-opposing surface.

This allows the main magnetic pole adjacent magnetic shield layer to absorb not only magnetic fluxes emitted from the side faces of the tip main magnetic pole part but also magnetic fluxes emitted from the side faces of the base main magnetic pole part on the medium-opposing surface side. The magnetic fluxes emitted from the side faces of the base main magnetic pole part on the medium-opposing surface side will be likely to reach tracks adjacent to the track to be recorded in the magnetic recording medium if not for the main magnetic pole adjacent magnetic shield layer. Therefore, providing the main magnetic pole adjacent magnetic shield layer at such a position yields a perpendicular recording thin-film magnetic head further suppressing the occurrence of side erase.

Preferably, the main magnetic pole adjacent magnetic shield layer extends along all the side faces of the main magnetic pole other than the medium-opposing surface. This allows the main magnetic pole adjacent magnetic shield layer to absorb magnetic fluxes emitted from all the side faces of the main magnetic pole other than the medium-opposing surface, thereby yielding a perpendicular recording thin-film magnetic head which further suppresses the occurrence of side erase.

Preferably, the main magnetic pole adjacent magnetic shield layer and the main magnetic pole have a constant distance therebetween in the whole area of the main magnetic pole adjacent magnetic shield layer. This allows the distance between the main magnetic pole adjacent magnetic shield layer and main magnetic pole in the whole area of the main magnetic pole magnetic shield layer to fall within a range where the main magnetic pole adjacent magnetic shield layer can effectively absorb unnecessary magnetic fluxes. As a result, a perpendicular recording thin-film magnetic head which further suppresses the occurrence of side erase is obtained.

Preferably, the perpendicular recording thin-film magnetic head in accordance with the present invention further comprises a pair of side shield layers extending along the medium-opposing surface so as to hold the tip main magnetic pole part by way of the nonmagnetic layer in the track width direction. This allows both of the main magnetic pole adjacent magnetic shield layer and side shield layers to absorb the magnetic fluxes emitted from the side faces of the main magnetic pole other than the medium-opposing surface. As a result, a perpendicular recording thin-film magnetic head further suppressing the occurrence of side erase is obtained.

Preferably, the return yoke is provided on the trailing side of the main magnetic pole. This allows the return yoke to have a function as a trailing shield. As a result, the magnetic fluxes emitted from the main magnetic pole can be restrained from spreading to the trailing side, whereby a perpendicular recording thin-film magnetic head adapted to a high linear recording density is obtained.

The method of manufacturing a perpendicular recording thin-film magnetic head in accordance with the present invention comprises a main magnetic pole forming step of forming a main magnetic pole having a tip main magnetic pole part extending in a height direction from a surface to be formed with a medium-opposing surface and a base main magnetic pole part connected to an end face in the height direction of the tip main magnetic pole part and wider than the tip main magnetic pole part in a track width direction; and a main magnetic pole adjacent magnetic shield layer forming step of forming a main magnetic pole adjacent magnetic shield layer extending along at least part of a side face in an area on the base main magnetic pole part side of the surface to be formed with the medium-opposing surface of the main magnetic pole when seen in a laminating direction, while holding a nonmagnetic layer between the main magnetic pole and the main magnetic pole adjacent magnetic shield layer.

The method of manufacturing a perpendicular recording thin-film magnetic head in accordance with the present invention yields a perpendicular recording thin-film magnetic head which suppresses the occurrence of side erase. Namely, when emitting magnetic fluxes from the main magnetic pole toward a magnetic recording medium for writing onto the magnetic recording medium, at least part of magnetic fluxes emitted from the side faces of the main magnetic pole other than the medium-opposing surface as seen in the laminating direction are absorbed by the main magnetic pole adjacent magnetic shield layer extending along the main magnetic pole. The magnetic fluxes emitted from the side faces of the main magnetic pole other than the medium-opposing surface may reach tracks adjacent to the track to be recorded in the magnetic recording medium if not for the main magnetic pole adjacent magnetic shield layer. Therefore, using the method of manufacturing a perpendicular recording thin-film magnetic head in accordance with the present invention reduces the magnetic fluxes emitted toward tracks adjacent to the track to be recorded in the magnetic recording medium at the time of writing onto the magnetic recording medium, whereby a perpendicular recording thin-film magnetic head suppressing the occurrence of side erase is obtained.

Preferably, in the main magnetic pole adjacent magnetic shield layer forming step, the nonmagnetic layer is formed such that the main magnetic pole adjacent magnetic shield layer and the main magnetic pole have a constant distance therebetween in the whole area of the main magnetic pole adjacent magnetic shield layer. This allows the distance between the main magnetic pole adjacent magnetic shield layer and main magnetic pole in the whole area of the main magnetic pole magnetic shield layer to fall within a range where the main magnetic pole adjacent magnetic shield layer can effectively absorb unnecessary magnetic fluxes. As a result, a perpendicular recording thin-film magnetic head further suppressing the occurrence of side erase is obtained.

Preferably, in the main magnetic pole adjacent magnetic shield layer forming step, at least part of the nonmagnetic layer is formed by atomic layer deposition. Consequently, the distance between the main magnetic pole adjacent magnetic shield layer and main magnetic pole can be made very strictly constant in the whole area of the main magnetic pole adjacent magnetic shield layer. As a result, a perpendicular recording thin-film magnetic head further suppressing the occurrence of side erase is obtained.

The present invention provides a perpendicular recording thin-film magnetic head which can fully suppress the occurrence of side erase, and a method of manufacturing the same.

BRIEF DESCRIPTION OF THE DRAWINGS

FIG. 4 is a plan view of the medium-opposing surface S near a tip main magnetic pole layer 60a;

FIG. 16 is a graph showing characteristics of normalized magnetic field strength vs. distance from a center part of a tip main magnetic pole layer 60a.

DESCRIPTION OF THE PREFERRED EMBODIMENTS

Figure 1:
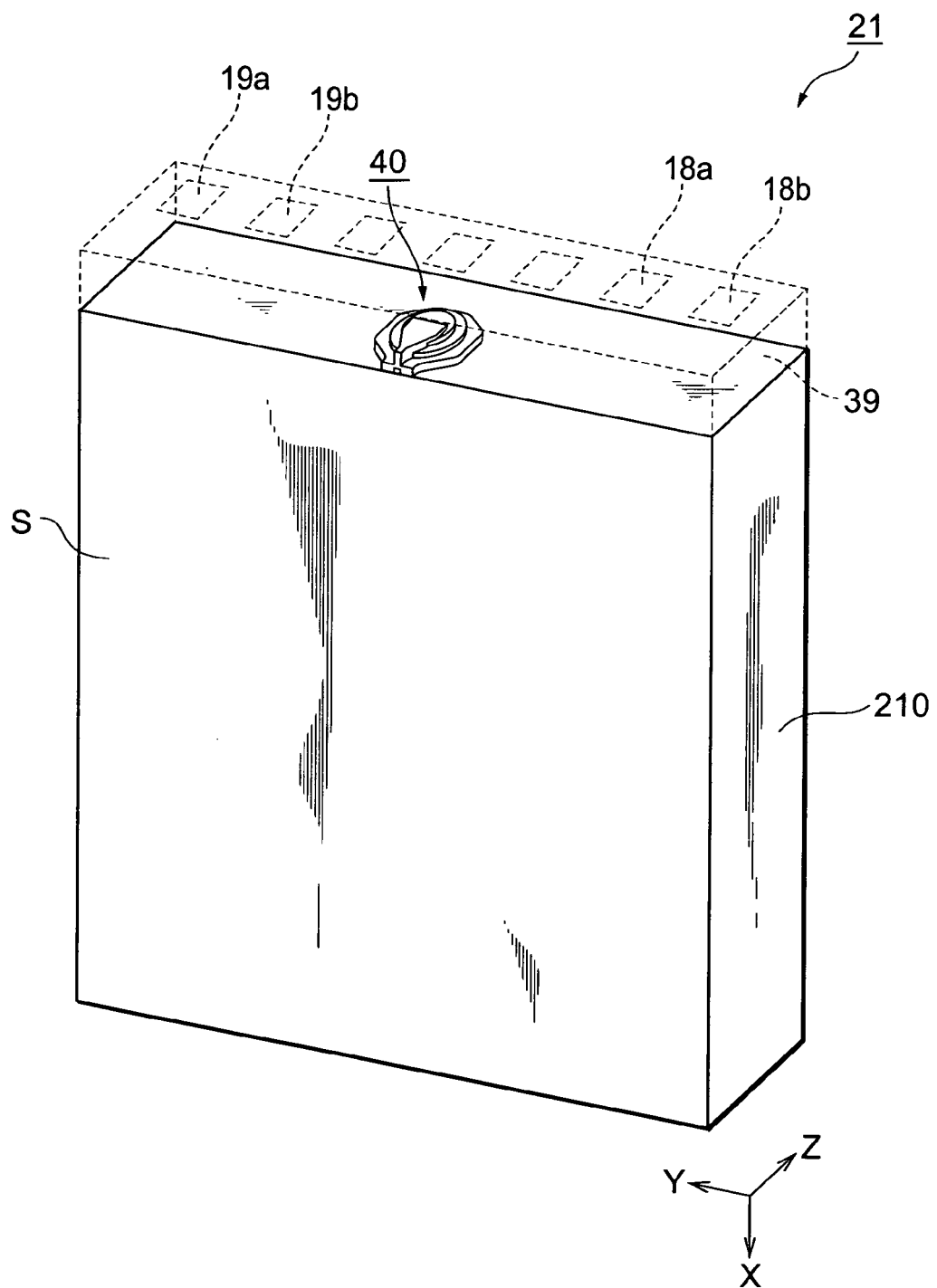
FIG. 1 is an enlarged perspective view of a perpendicular recording thin-film magnetic head 21.

In the following, modes for carrying out the present invention will be explained in detail with reference to the accompanying drawings. In the drawings, the same elements are referred to with the same reference numbers. The dimensional ratios in and among constituents in the drawings are arbitrary for the convenience of viewing the drawings.

First, the perpendicular recording thin-film magnetic head in accordance with an embodiment of the present invention will be explained.

FIG. 1 is an enlarged perspective view of a perpendicular recording thin-film magnetic head 21. The perpendicular recording thin-film magnetic head 21 is one in which a magnetic head part 40 is formed on a side face of a slider substrate 210 shaped like a substantially rectangular parallelepiped mainly composed of AlTiC ($Al_2O_3 \cdot TiC$). The surface on the front side in the drawing is a medium-opposing surface S facing a recording surface of a magnetic recording medium 10 (see FIG. 2). When the magnetic recording medium 10 rotates, airflows accompanying the rotation levitate the perpendicular recording thin-film magnetic head 21, thereby separating the medium-opposing surface S from the recording surface of the magnetic recording medium 10. The medium-opposing surface S is processed into a predetermined form such that the perpendicular recording thin-film magnetic head 21 levitates as designed. The perpendicular recording thin-film magnetic head 21 is provided with an insulating layer 39 as an overcoat layer illustrated by broken lines. Recording pads 18a, 18b and reproducing pads 19a, 19b are attached onto the insulating layer 39. The medium-opposing surface S may be coated with DLC (Diamond-Like Carbon) or the like.

Figure 2:
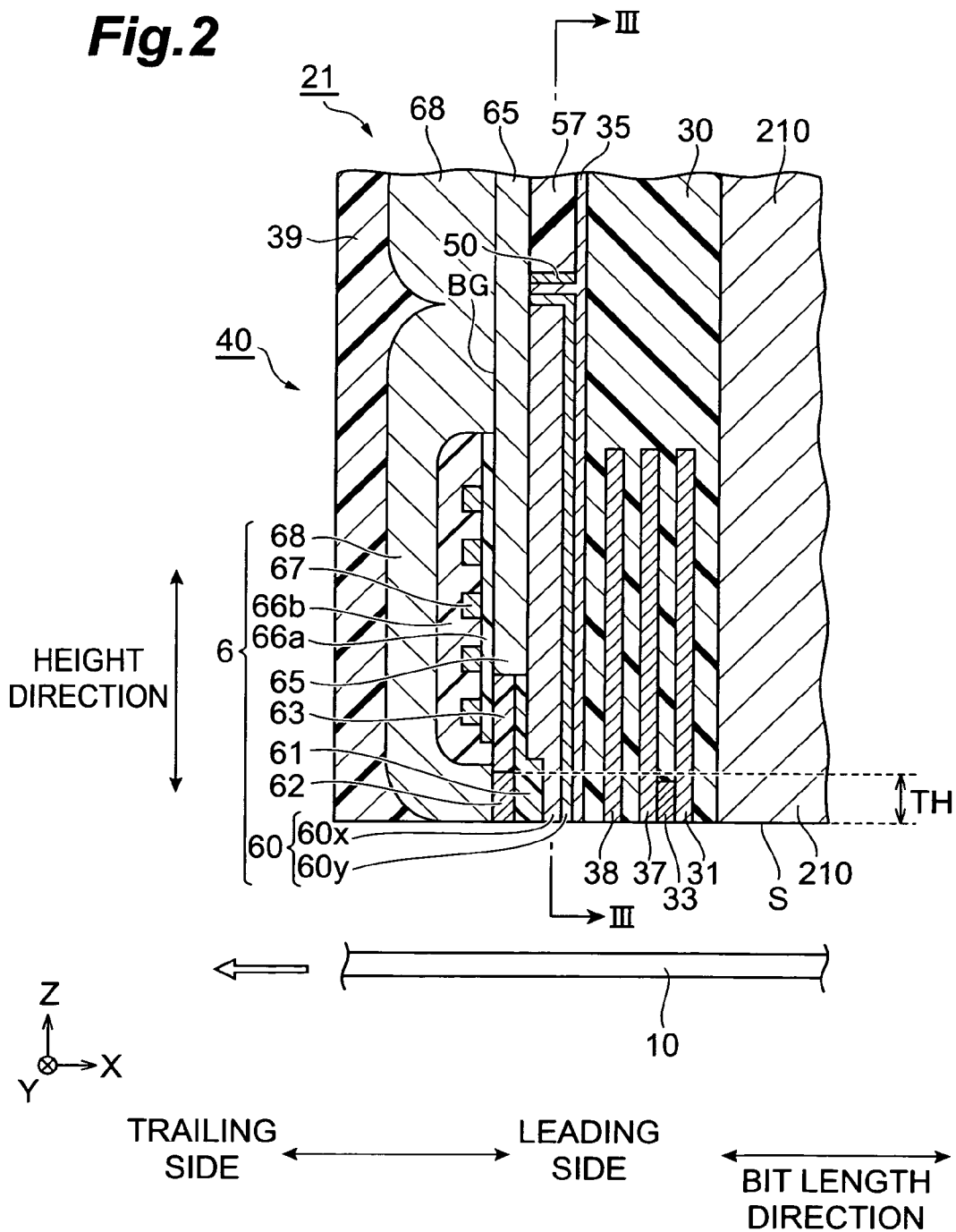
FIG. 2 is a sectional view of the perpendicular recording thin-film magnetic head 21 taken along a direction perpendicular to a medium-opposing surface S thereof shown in FIG. 1.

FIG. 2 is a sectional view taken along a direction perpendicular to the medium-opposing surface S of the perpendicular recording thin-film magnetic head 21 shown in FIG. 1 and schematically illustrates how it opposes the magnetic recording medium 10.

As shown in FIG. 2, the perpendicular recording thin-film magnetic head 21 comprises the slider substrate 210 and the magnetic head part 40 laminated on the slider substrate 210. The magnetic head part 40 includes a lower magnetic shield layer 31, an upper magnetic shield layer 37, an MR (magnetoresistive) device layer 33 as a magnetism detecting film arranged therebetween, and an electromagnetic coil device 6 as a magnetic recording device.

The lower magnetic shield layer 31 and upper magnetic shield layer 37 are planar layers extending from the medium-opposing surface S in the height direction (direction perpendicular to the medium-opposing surface S, i.e., direction extending along the Z axis in FIG. 2) so as to become substantially parallel to the laminating surface of the slider substrate 210, while the lower magnetic shield layer 31 is closer to the slider substrate 210 than is the upper magnetic shield layer 37. The lower magnetic shield layer 31 and upper magnetic shield layer 37 form part of the medium-opposing surface S. The MR device layer 33 is formed such as to be held between the lower magnetic shield layer 31 and upper magnetic shield layer 37, and extends in the height direction from the medium-opposing surface S.

Each of the lower magnetic shield layer 31 and upper magnetic shield layer 37 can be constituted by a magnetic material such as NiFe, CoFeNi, CoFe, FeN, or FeZrN having a thickness on the order of 0.5 to 3 μm formed by a pattern plating method including frame plating, for example. The lower magnetic shield layer 31 and upper magnetic shield layer 37 prevent the MR device layer 33 from being affected by external magnetic fields which cause noises.

For example, the MR device layer 33 is a current-perpendicular-to-plane (CPP) multilayer film in which a sense current flows in a direction perpendicular to its laminating surface, and for which a tunneling magnetoresistive (TMR) film or CPP giant magnetoresistive (GMR) film can favorably be used. Using such a magnetoresistive film as the MR device layer 33 makes it possible to sense signal magnetic fields from magnetic disks with a very high sensitivity. When a CPP multilayer film is used as the MR device layer 33, the upper and lower magnetic shield layers 37, 31 also function as upper and lower electrode layers for supplying a sense current to the MR device layer 33, respectively.

When a TMR device is used as the M device layer 33, it has a structure successively laminating an antiferromagnetic layer having a thickness on the order of 5 to 15 nm made of IrMn, PtMn, NiMn, RuRhMn, or the like; a magnetization pinned layer which is constituted by CoFe or the like which is a ferromagnetic material or two layers of CoFe or the like holding therebetween a nonmagnetic metal layer such as Ru, while having a magnetization direction pinned by the antiferromagnetic layer; a tunnel barrier layer made of a nonmagnetic dielectric material obtained by oxidizing a metal film having a thickness on the order of 0.5 to 1 nm made of Al, AlCu, Mg, or the like with oxygen introduced into a vacuum apparatus or naturally, for example; and a free magnetization layer which forms a tunnel junction with the magnetization pinned layer through the tunnel barrier layer and is constituted by a two-layer film composed of CoFe or the like having a thickness on the order of 1 nm and NiFe or the like having a thickness on the order of 3 to 4 nm, which are ferromagnetic materials, for example. When a CPP GMR film is used as the MR device layer 33, the tunnel barrier layer in the abovementioned TMR film is replaced with a nonmagnetic conductive layer having a thickness on the order of 1 to 3 nm made of Cu or the like.

As shown in FIG. 2, an interdevice magnetic shield layer 38 made of a material similar to that of the upper magnetic shield layer 37 is formed between the upper magnetic shield layer 37 and magnetoresistive coil device 6. The interdevice magnetic shield layer 38 acts to shield the MR device layer 33 from magnetic fields generated by the electromagnetic coil device 6 and prevent external noises from occurring at the time of reading. A backing coil part may further be formed between the interdevice magnetic shield layer 38 and electromagnetic coil device 6. The backing coil part generates a magnetic flux which cancels a magnetic flux loop traveling the upper and lower electrode layers of the MR device layer 33 after being caused by the electromagnetic coil device 6, and suppresses the phenomenon of wide adjacent track erasure (WATE) which is an unnecessary writing or erasing action for a magnetic disk.

An insulating layer 30 made of alumina or the like is formed between the upper and lower magnetic shield layers 37, 31 on the side of the MR device layer 33 opposite from the medium-opposing surface S, on the upper and lower magnetic shield layers 37, 31, on the interdevice magnetic shield layer 38 on the side opposite from the medium-opposing surface S, between the lower magnetic shield layer 31 and slider substrate 210, and between the interdevice shield layer 38 and electromagnetic coil device 34.

A current-in-plane (CIP) multilayer film can also be used as the MR device layer 33. In this case, the insulating layer 30 is also provided between each of the upper and lower magnetic shield layers 37, 31 and the MR device layer 33. Though not depicted, an MR lead conductor layer for supplying a sense current to the MR device layer 33 and taking out a reproduced output is also formed in this case.

The electromagnetic coil device 6 is a magnetic recording device for perpendicular magnetic recording, and comprises a main magnetic pole layer 60, an auxiliary magnetic pole layer 65, a magnetic layer 62, an insulating layer 63, a write gap layer 61, a gap layer 66*a*, a coil insulating layer 66*b*, a coil layer 67, and a return yoke layer 68 as shown in FIG. 2.

The main magnetic pole layer 60 is laminated on the insulating layer 30 by way of an insulating layer 35 and constituted by a seed layer part 60*x* and a plating layer part 60*y*. The main magnetic pole layer 60 extends in the height direction from the medium-opposing surface S, and functions as a magnetism guiding path for guiding a magnetic flux induced by the coil layer 67 to a recording layer of the magnetic recording medium 10 where writing is made, while converging the magnetic flux. Here, it will be preferred if the end part of the main magnetic pole layer 60 on the medium-opposing surface S side has a width in the track width direction (see FIG. 3) and a thickness in the bit length direction (direction extending along the X axis in FIG. 2) perpendicular to the track direction and parallel to the medium-opposing surface S which are smaller than those in the remaining part. This makes it possible to generate fine, strong writing magnetic fields adapted to a high recording density.

The return yoke layer 68 is provided on the trailing side, i.e., on the downstream side in the moving direction of the magnetic recording medium 10 at the time of magnetic recording actions, of the main magnetic pole layer 60, and extends in the height direction from the medium-opposing surface S. Also, the return yoke layer 68 opposes the main magnetic pole layer 60 through the write gap layer 61 in the medium-opposing surface S, and is magnetically coupled to the main magnetic pole layer 60 through the auxiliary magnetic pole layer 65 at a back gap part BG which is a position separated in the height direction from the medium-opposing surface S. The return yoke layer 68 and main magnetic pole layer 60 may directly be coupled together without providing the auxiliary magnetic pole layer 65 in particular. The upstream side in the moving direction of the magnetic recording medium 10 at the time of magnetic recording actions will be referred to as leading side.

The return yoke layer 68 acts to receive magnetic fluxes magnetizing the recording layer of the magnetic recording medium 10 and then returning toward the perpendicular recording thin-film magnetic head 21 after being emitted from the main magnetic pole layer 60. Thus, the main magnetic pole layer 60, magnetic recording medium 10, and return yoke layer 68 construct a magnetic circuit, whereby the perpendicular recording thin-film magnetic head 21 performs perpendicular magnetic recording onto the magnetic recording medium 10.

The magnetic layer 62 is formed between the write gap layer 61 and return yoke layer 68 so as to be exposed at the medium-opposing surface S. Since the magnetic layer 62 magnetically couples with the return yoke layer 68, the magnetic gap length between the return yoke layer 68 and main magnetic pole layer 60 is shortened by the thickness of the magnetic layer 61 in the bit length direction. Further, the return yoke layer 68. and magnetic layer 61 form a trailing shield part. The trailing shield part absorbs, in the magnetic fluxes emitted from the main magnetic pole layer 60, those emitted so as to spread to the trailing side. This makes the magnetic field gradient steeper between the magnetic layer 61 and mair magnetic pole layer 60 in the vicinity of the medium-opposing surface S. As a result, jitter becomes smaller in signal outputs, whereby the error rate at the time of reading can be lowered. The magnetic layer 61 is not necessary in particular, so that the trailing shield part may be formed by the return yoke layer 68 alone.

Preferably, the main magnetic pole layer 60 has a total thickness of about 0.01 to about 0.5 μm at an end part on the medium-opposing surface S side and a total thickness of about 0.5 to about 3.0 μm in the remaining part, and is constituted by an alloy made of two or three of Ni, Fe, and Co, an alloy mainly composed of them and further doped with a predetermined element, or the like, for example. The track width may be 100 nm, for example. A method of manufacturing the main magnetic pole layer 60 will be explained later. The return yoke layer 68 is constituted by an alloy having a thickness of about 0.5 to about 5 μm made of two or three of Ni, Fe, and Co formed by frame plating, sputtering, or the like, an alloy mainly composed of them and doped with a predetermined element, or the like, for example.

The auxiliary magnetic pole layer 65 and magnetic layer 62 are constituted by a material similar to that of the return yoke layer 68.

The insulating layer 63 separates the auxiliary magnetic pole layer 65 and magnetic layer 62 from each other in the height direction, and is constituted by $Al_2O_3$, DLC, or the like formed by using sputtering, CVD, or the like, for example.

The gap layer 66a separates the coil layer 67 and auxiliary magnetic pole layer 65 from each other, and is constituted by $Al_2O_3$, DLC, or the like having a thickness of about 0.01 to about 0.5 μm formed by using sputtering, CVD, or the like, for example.

The coil layer 67 is constituted by Cu or the like having a thickness of about 0.5 to about 3 μm formed by using frame plating or the like, for example. The coil layer 67 is formed such as to surround the back gap part BG.

The coil insulating layer 66b separates the coil layer 67 and return yoke layer 68 from each other, and is constituted by an electrically insulating material such as a thermally cured resist or alumina layer having a thickness of about 0.1 to about 5 μm, for example.

On the side of the electromagnetic coil device 6 opposite from the slider substrate 210, the insulating layer 39 as an overcoat layer is formed such as to cover the electromagnetic coil device 6.

Figure 3:
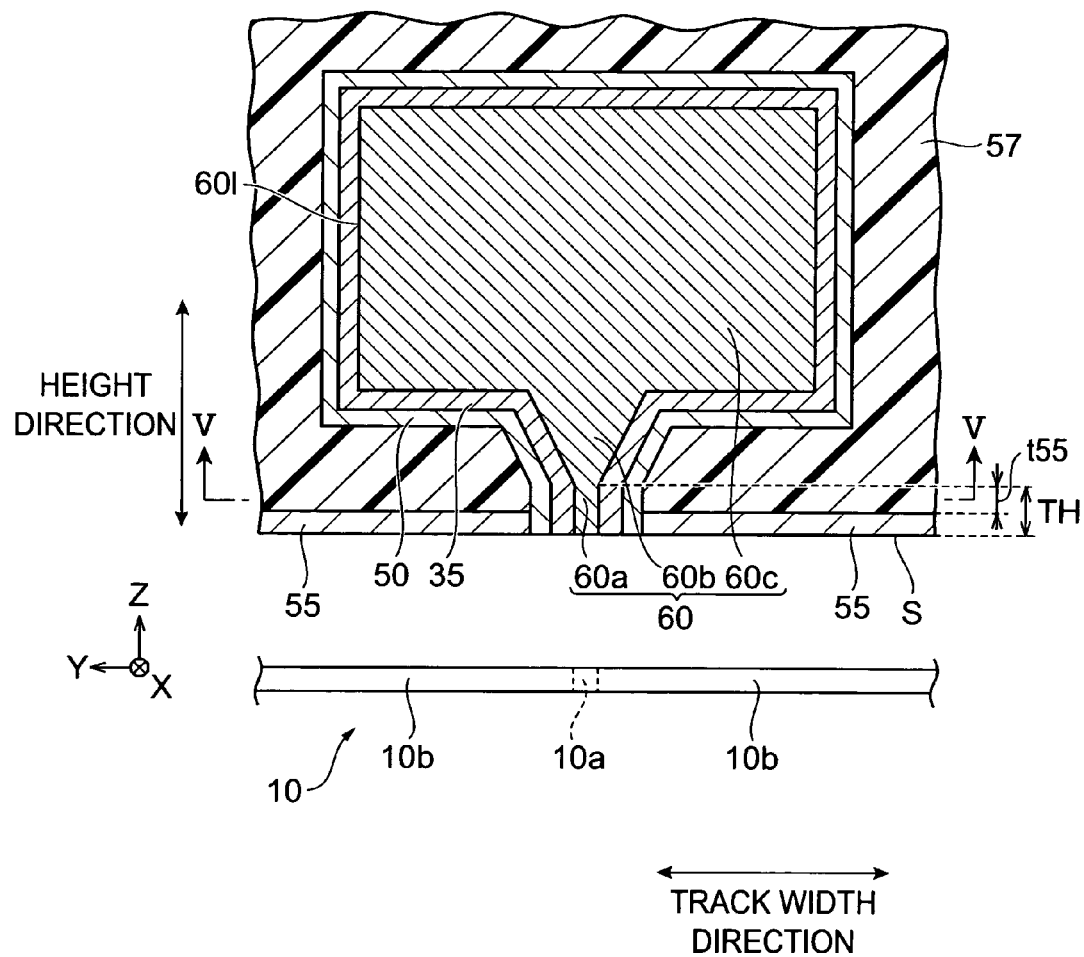
FIG. 3 is a sectional view of the perpendicular recording thin-film magnetic head 21 taken along the line III-III of FIG. 2.

FIG. 3 is a sectional view of the perpendicular recording thin-film magnetic head 21 taken along the line III-III of FIG. 2, schematically showing how it opposes the magnetic recording medium 10.

As shown in FIG. 3, the main magnetic pole layer 60 as seen in its laminating direction (direction extending along the X axis) comprises a tip main magnetic pole part 60a having a narrow width in the track width direction and constituting part of the medium-opposing surface S, a middle main magnetic pole part 60b which is connected to the tip main magnetic pole part 60a on the side opposite from the medium-opposing surface S and wider in the track width direction than the tip main magnetic pole part 60a, and a rear main magnetic pole part 60c which is connected to the middle main magnetic pole part 60b on the side opposite from the medium-opposing surface S and wider in the track width direction greater than the middle main magnetic pole part 60b. The middle main magnetic pole part 60b and rear main magnetic pole part 60c form a base main magnetic pole part. The length of the tip main magnetic pole part 60a in the height direction (direction extending along the Z axis in FIG. 3) is a throat height TH. An area of the magnetic recording medium 10 which opposes the tip main magnetic pole part 60a is a track 10a to be recorded at the time of a writing action.

Along all the side faces 60l of the main magnetic pole layer 60, a main magnetic pole adjacent magnetic shield layer 50 which is a magnetic shield layer made of a ferromagnetic material is provided, while holding the nonmagnetic layer 35 between the main magnetic pole layer 60 and the main magnetic pole adjacent magnetic shield layer 50.

Further, a pair of side shield layers 55 which are magnetic shield layers made of a ferromagnetic body are provided along the medium-opposing surface S so as to hold therebetween the tip main magnetic pole part 60a by way of the nonmagnetic layer 35 in the track width direction. Preferably, the distance t55 from the end face of the side shield layers 55 opposite from the medium-opposing surface S to the end face of the tip main magnetic pole layer 60a opposite from the medium-opposing surface S is 0.1 to 0.5 μm. When the distance t55 falls within this range, the side shield layers 55 can effectively absorb unnecessary magnetic fluxes as will be explained later. A method of manufacturing the main magnetic pole adjacent magnetic shield layer 50 and side shield layers 55 will be explained later.

Figure 4:
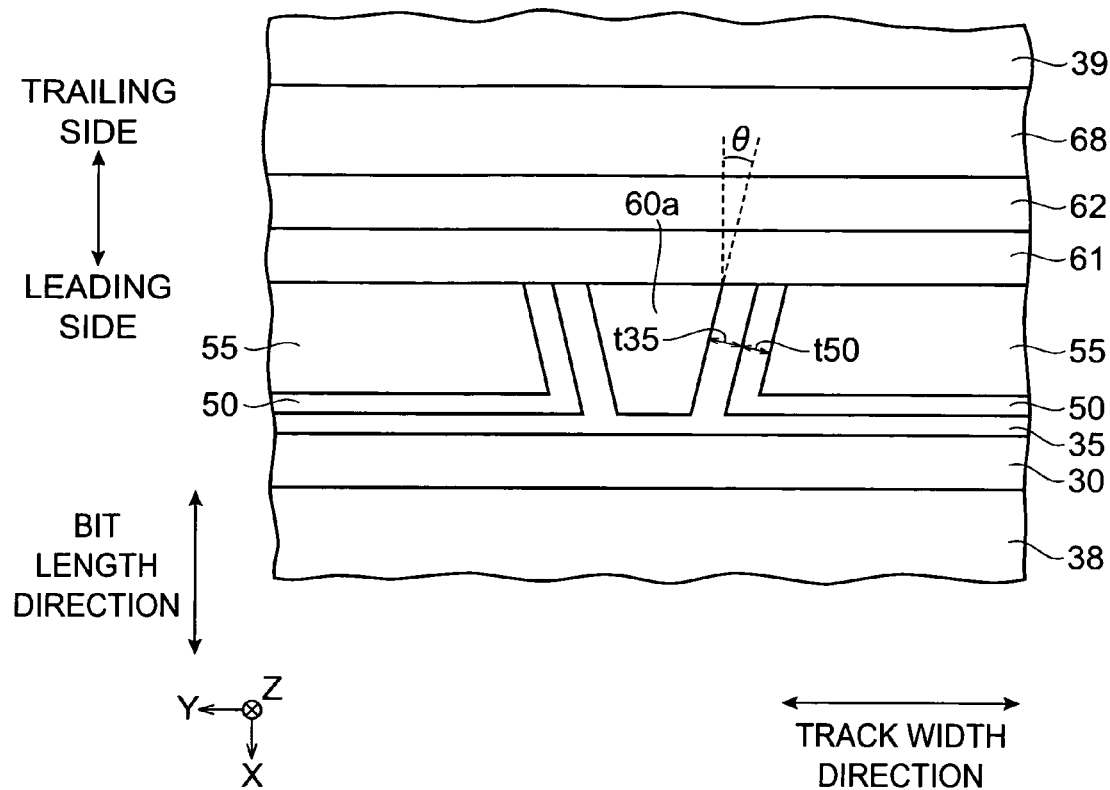

FIG. 4 is a plan view of the medium-opposing surface S near the tip main magnetic pole layer 60a.

Preferably, as shown in FIG. 4, the end face of the tip main magnetic pole layer 60a on the medium-opposing surface S side is shaped into an inverted trapezoid in which the side on the leading side is shorter than the side on the trailing side. Namely, the end face of the tip main magnetic pole layer 60a on the medium-opposing surface S side is provided with a bevel angle θ so as to prevent unnecessary writing and the like from being effected under the influence of a skew angle caused by driving with a rotary actuator. The bevel angle θ is about 15°, for example.

Preferably, the insulating layer 35 has a thickness t35 of 0.06 to 0.16 μm. When t35 falls within this range, the main magnetic pole adjacent magnetic shield layer 50 can effectively absorb unnecessary magnetic fluxes as will be explained later. The main magnetic pole adjacent magnetic shield layer 50 has a thickness t50 of 0.005 to 0.06 μm, for example. The thickness t35 of the insulating layer 35, i.e., distance t35 between the main magnetic pole adjacent magnetic shield layer 50 and main magnetic pole layer 60, is constant in the whole area of the main magnetic pole adjacent magnetic shield layer 50 (see FIG. 3).

Figure 5:
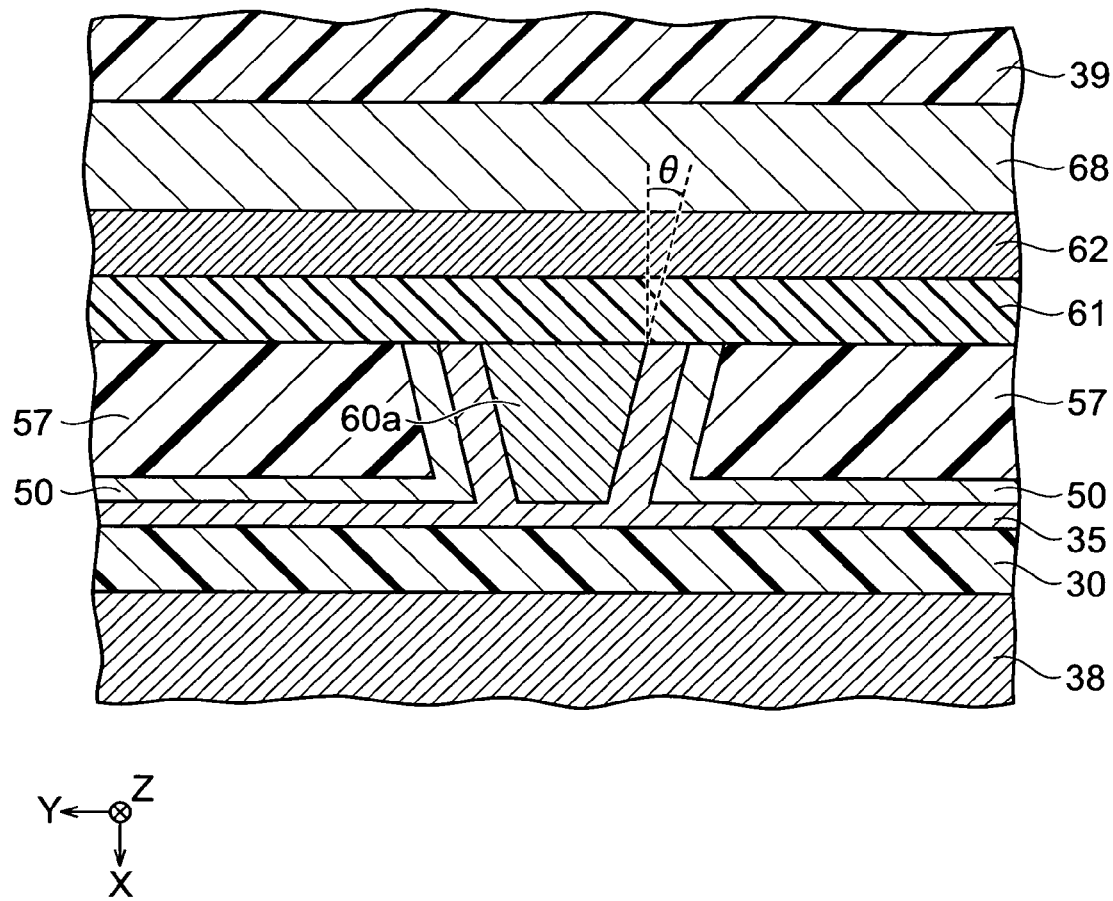
FIG. 5 is a sectional view of the perpendicular recording thin-film magnetic head 21 taken along the line V-V of FIG. 3.

As mentioned above, a pair of side shield layers 55 are provided along the medium-opposing surface S so as to hold therebetween the tip main magnetic pole part 60a by way of the nonmagnetic layer 35 in the track width direction. On the other hand, as shown in FIG. 5 which is a sectional view of the perpendicular recording thin-film magnetic head 21 taken along the line V-V of FIG. 3, a sectional view parallel to the medium-opposing surface S of an area of the tip main magnetic pole part 60a which is not held between the side shield layers 55 is equivalent to one in which the side shield layers 55 in the plan view (FIG. 4) at the medium-opposing surface S are replaced with an insulating layer 57.

With reference to FIGS. 2, 6A to 12B, and 13, the method of manufacturing a perpendicular recording thin-film magnetic head in accordance with an embodiment of the present invention will now be explained. Not only sputtering but chemical vapor deposition (CVD), electroplating, or the like can also be used for forming each layer. For etching, not only dry etching such as IBE (ion beam etching), RIE (reactive ion etching), and sputtering employing noble gases, but chemical etching (wet etching) or CMP (chemical mechanical polishing) can also be used.

FIGS. 6A, 7A, 8A, 9A, 10A, 11A, and 12A are a series of sectional views showing intermediates of the perpendicular recording thin-film magnetic head 21 and correspond to the plan view (FIG. 4) of the medium-opposing surface S near the tip main magnetic pole layer 60a. Similarly, FIGS. 6B, 7B, 8B, 9B, 10B, 11B, and 12B are a series of sectional views showing intermediates of the perpendicular recording thin-film magnetic head 21 and correspond to the sectional view (FIG. 5) of the perpendicular recording thin-film magnetic head 21 taken along the line V-V of FIG. 3.

First, the lower magnetic shield layer 31, MR device layer 33, and upper magnetic shield layer 37 are successively laminated by way of the insulating layer 30 on the slider substrate 210. Subsequently, by way of the insulating layer 30, the interdevice magnetic shield layer 38 is laminated. Then, the insulating layer 30 is further laminated (see FIG. 2).

Figure 6A:
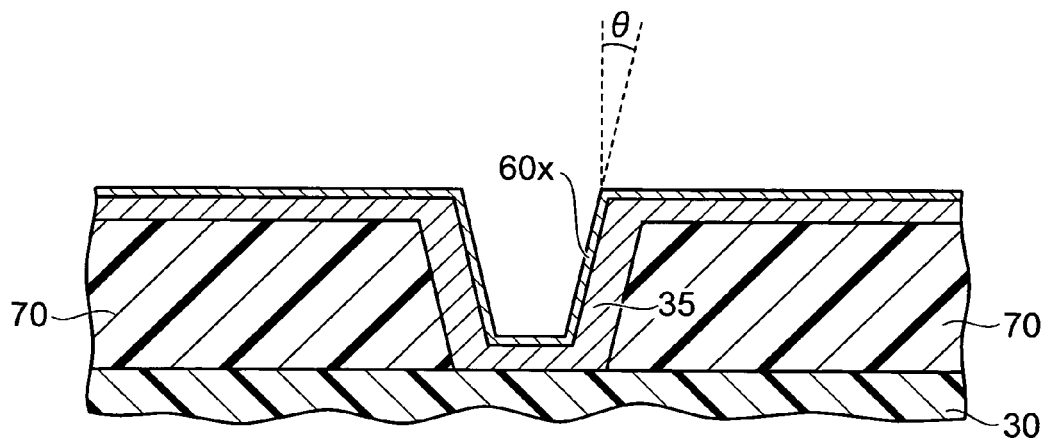
FIG. 6A is a sectional view of an intermediate of the perpendicular recording thin-film magnetic head 21.
Figure 6B:
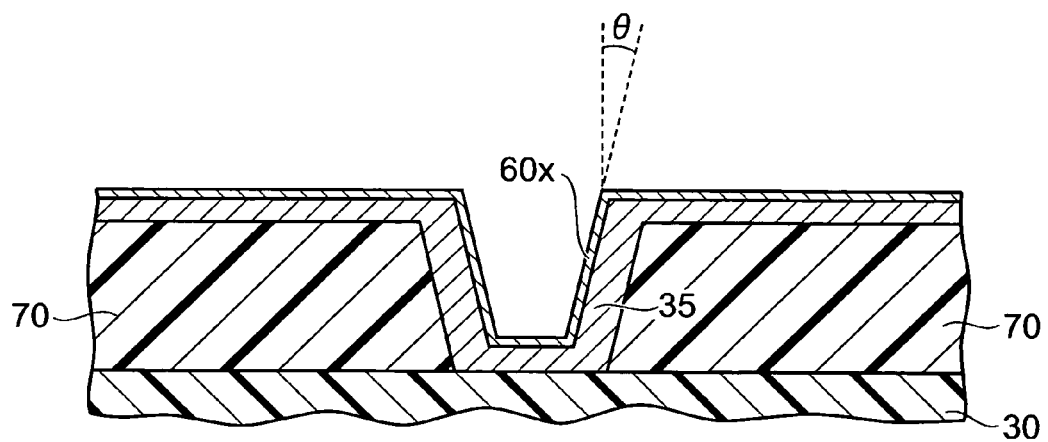
FIG. 6B is a sectional view of the intermediate of the perpendicular recording thin-film magnetic head 21.

Next, as shown in FIGS. 6A and 6B, a resist 70 formed with an inverted trapezoidal opening is patterned on the insulating layer 30. Thereafter, the insulating layer 35 and seed layer part 60x are formed on the whole surface. Preferably, the insulating layer 35 is formed by atomic layer deposition (ALD). The seed layer part 60x can be formed by sputtering or the like. As a consequence, the seed layer part 60x forms an inverted trapezoidal depression. The angle θ of a side face of the depression having the inverted trapezoidal form is set identical to the bevel angle θ of the end face of the tip main magnetic pole layer 60a on the medium-opposing surface S side.

Figure 7A:
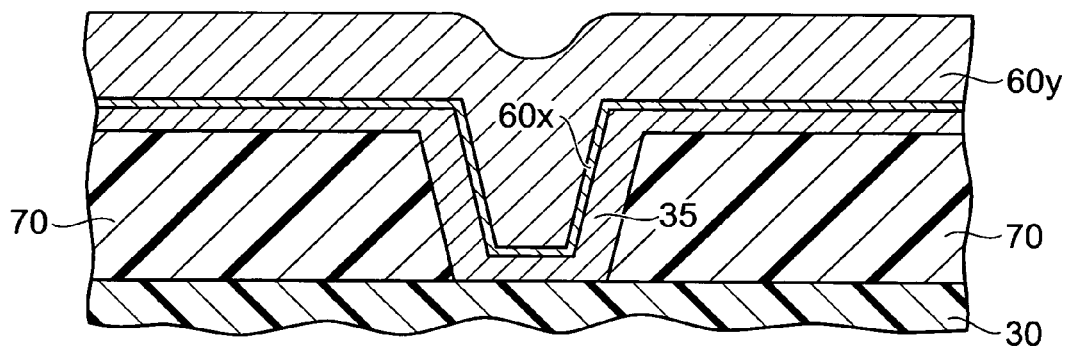
FIG. 7A is a sectional view of an intermediate of the perpendicular recording thin-film magnetic head 21.
Figure 7B:
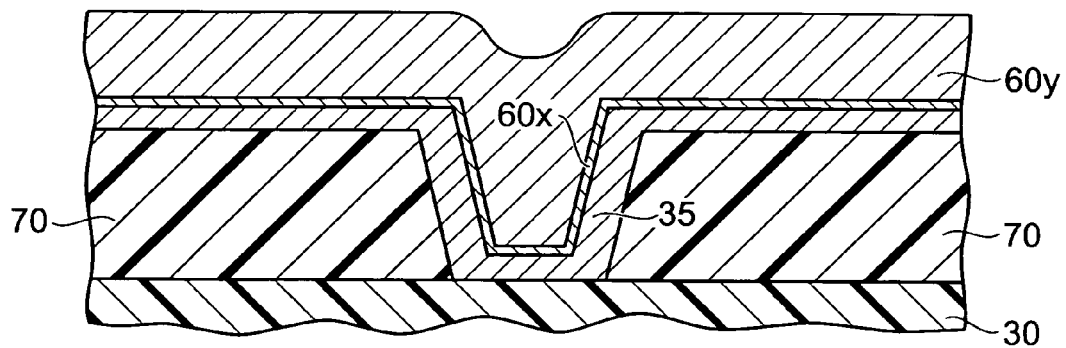
FIG. 7B is a sectional view of the intermediate of the perpendicular recording thin-film magnetic head 21.

Subsequently, as shown in FIGS. 7A and 7B, the plating layer part 60y is formed by electroplating or the like on the seed layer part 60x.

Figure 8A:
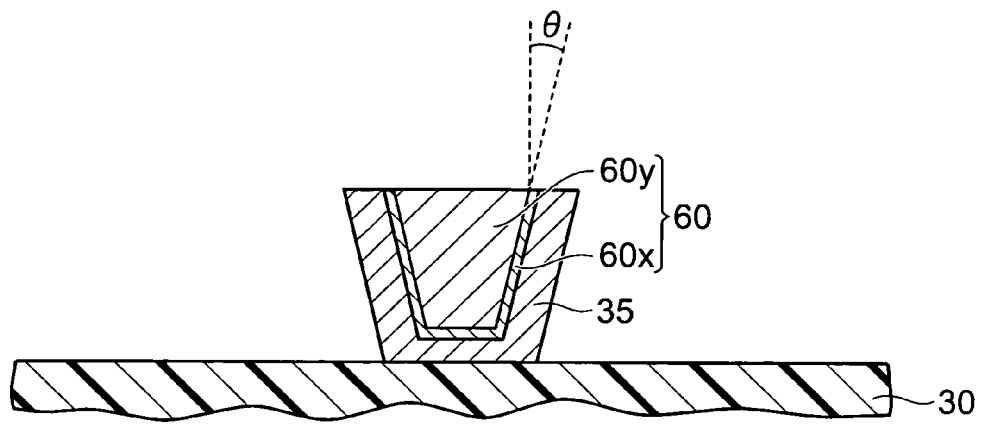
FIG. 8A is a sectional view of an intermediate of the perpendicular recording thin-film magnetic head 21.
Figure 8B:
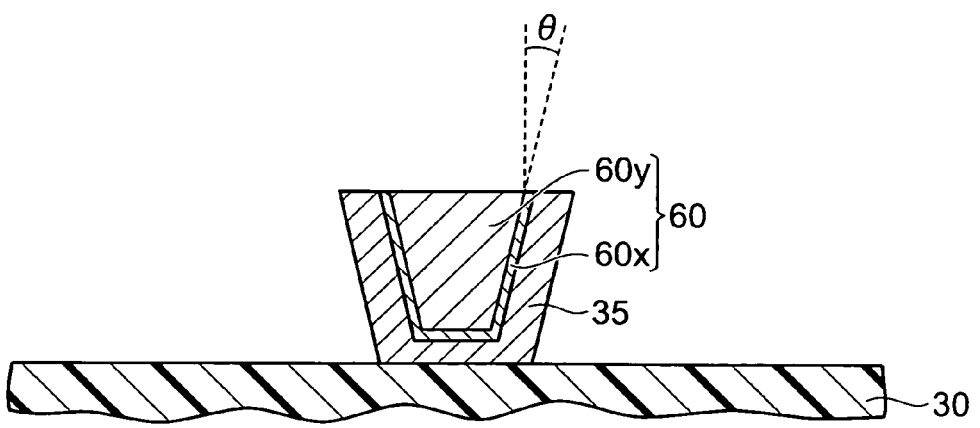
FIG. 8B is a sectional view of the intermediate of the perpendicular recording thin-film magnetic head 21.

Then, as shown in FIGS. 8A and 8B, the plating layer part 60y is etched by CMP or the like until the resist 70 is exposed, and then the resist 70 is removed. Thus, an inverted trapezoidal multilayer body composed of the insulating layer 35 and main magnetic pole layer 60 is formed.

Figure 9A:
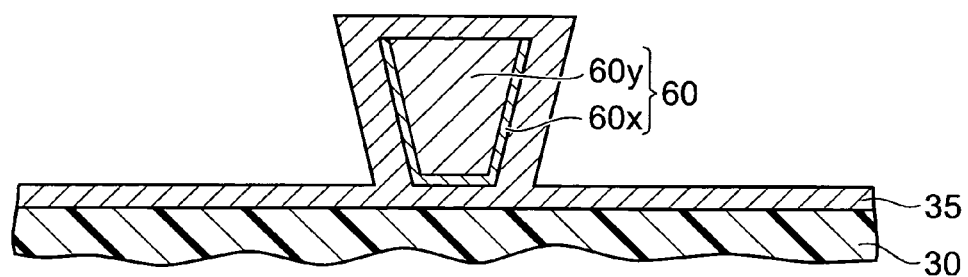
FIG. 9A is a sectional view of an intermediate of the perpendicular recording thin-film magnetic head 21.
Figure 9B:
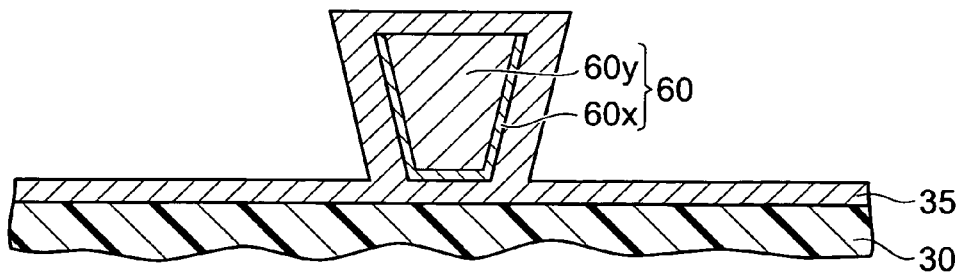
FIG. 9B is a sectional view of the intermediate of the perpendicular recording thin-film magnetic head 21.

Next, as shown in FIGS. 9A and 9B, the insulating layer 35 is formed on the whole surface. Preferably, the insulating layer 35 is formed by atomic layer deposition. Using the atomic layer deposition, the insulating layer 35 can also be formed on side faces of the inverted trapezoidal multilayer body made of the insulating layer 35 and main magnetic pole layer 60.

Figure 10A:
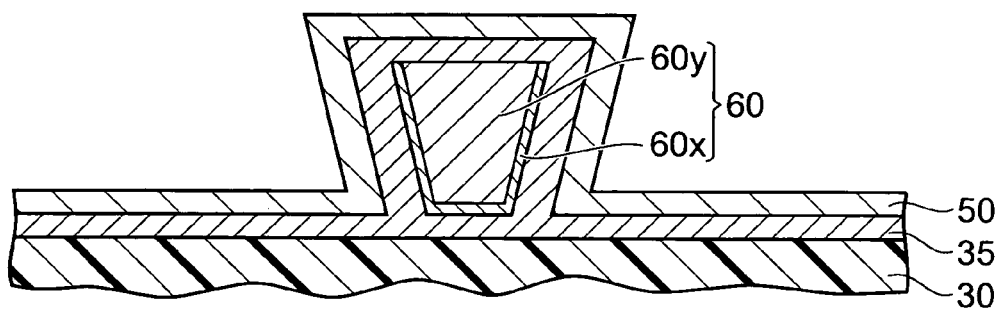
FIG. 10A is a sectional view of an intermediate of the perpendicular recording thin-film magnetic head 21.
Figure 10B:
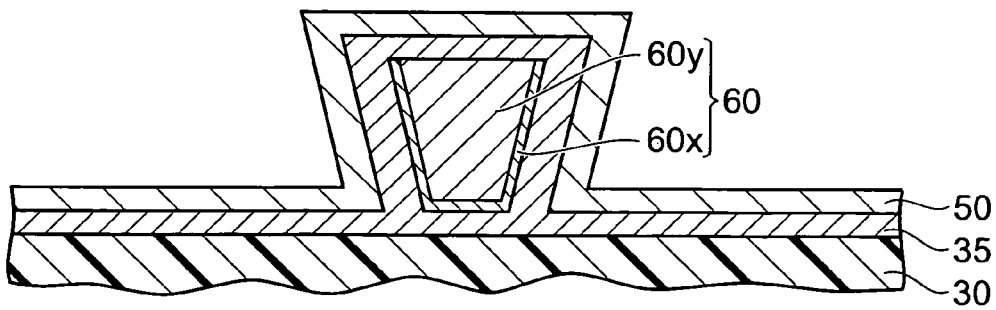
FIG. 10B is a sectional view of the intermediate of the perpendicular recording thin-film magnetic head 21.

Subsequently, as shown in FIGS. 10A and 10B, the main magnetic pole adjacent magnetic shield layer 50 is formed by sputtering or the like on the whole surface.

Figure 11A:
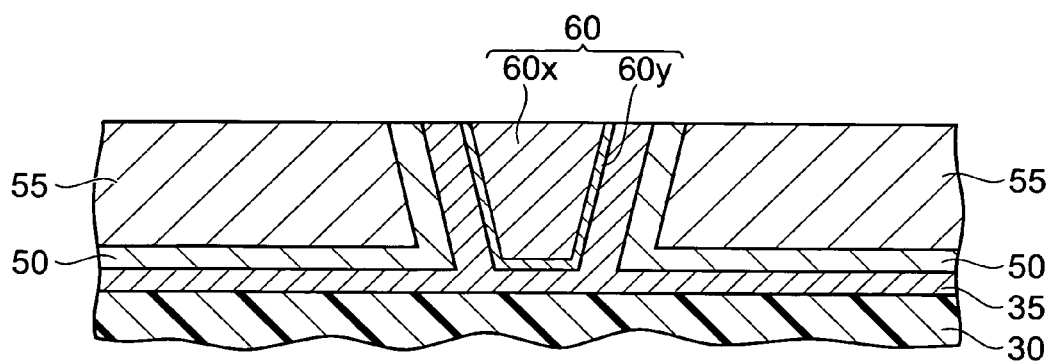
FIG. 11A is a sectional view of an intermediate of the perpendicular recording thin-film magnetic head 21.
Figure 11B:
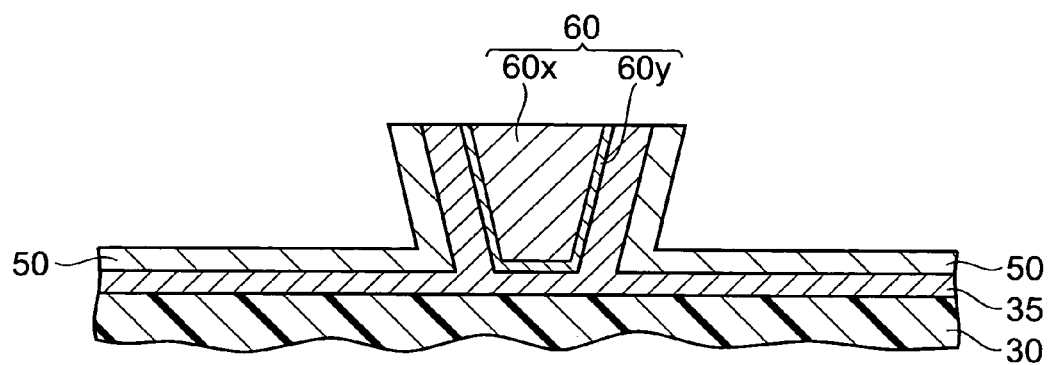
FIG. 11B is a sectional view of the intermediate of the perpendicular recording thin-film magnetic head 21.

Next, as shown in FIGS. 11A and 11B, the side shield layer 55 is formed only in the area corresponding to the sectional view of FIG. 11A, and then the main magnetic pole adjacent magnetic shield layer 50 is etched in the areas corresponding to the sectional views of FIGS. 11A and 11B until the main magnetic pole layer 60 is exposed.

Figure 12A:
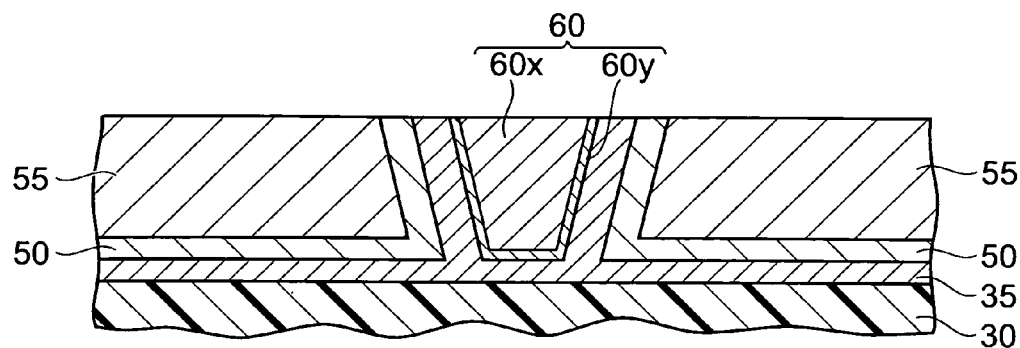
FIG. 12A is a sectional view of an intermediate of the perpendicular recording thin-film magnetic head 21.
Figure 12B:
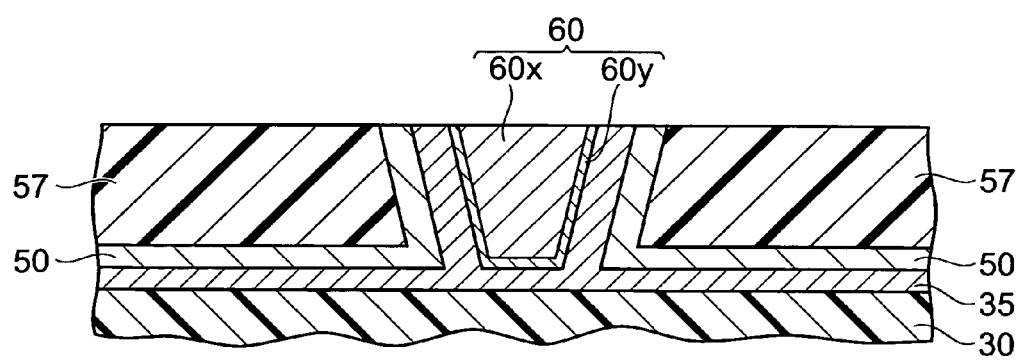
FIG. 12B is a sectional view of the intermediate of the perpendicular recording thin-film magnetic head 21.

Subsequently, as shown in FIGS. 12A and 12B, the insulating layer 57 is formed only in the area corresponding to the sectional view of FIG. 12B.

Figure 13:
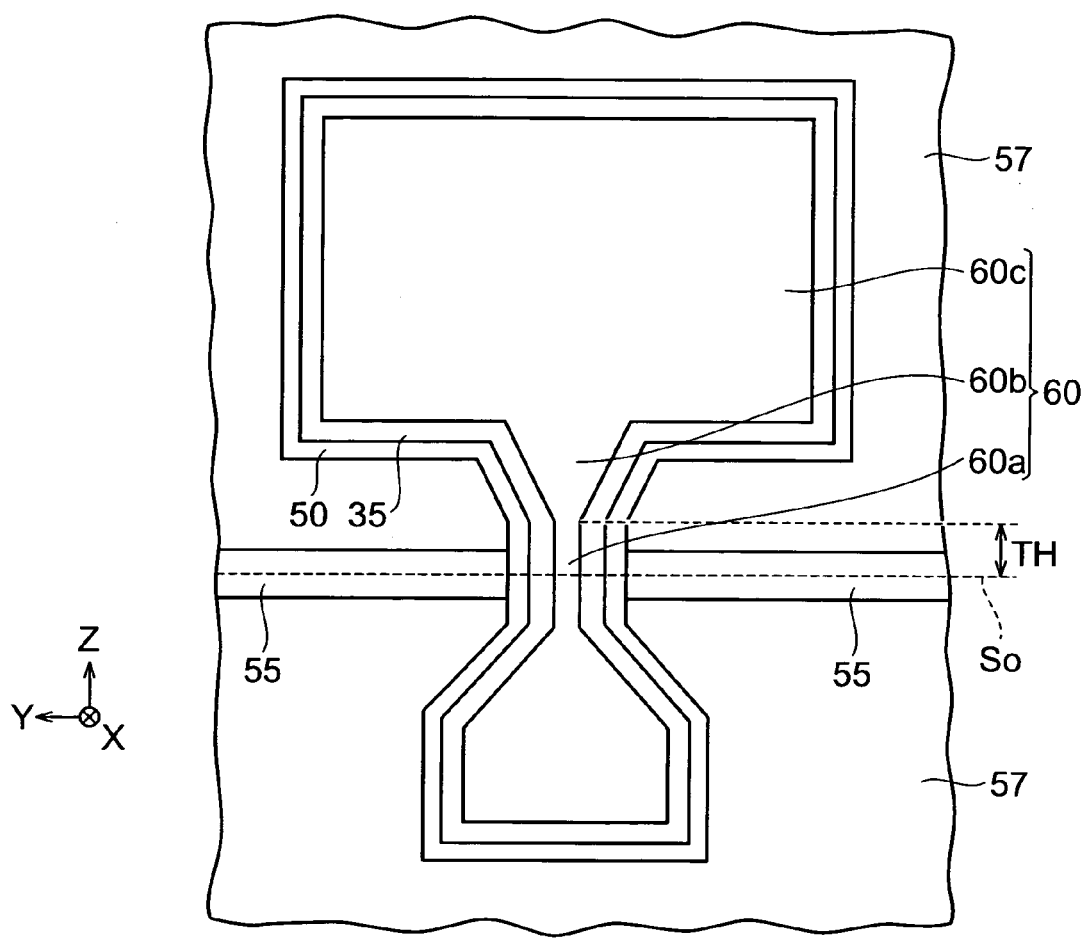
FIG. 13 is a plan view of the intermediate of the perpendicular recording thin-film magnetic head 21.

FIG. 13 shows a plan view of the intermediate of the perpendicular recording thin-film magnetic head 21 in this stage. As shown in FIG. 13, the foregoing process forms the main magnetic pole layer 60 comprising the tip main magnetic pole part 60a extending in the height direction from a surface $S_0$ to be formed with the medium-opposing surface, the middle main magnetic pole part 60b wider in the track width direction than the tip main magnetic pole part 60a, and the rear main magnetic pole part 60c connected to the middle main magnetic pole part 60b on the side opposite from the medium-opposing surface S and wider in the track width direction than the middle main magnetic pole part 60b. The main magnetic pole adjacent magnetic shield layer 50 is formed so as to extend along all the side faces of the main magnetic pole layer 60, while holding the nonmagnetic layer 35 therebetween.

Thereafter, by known methods, the remaining elements of the electromagnetic coil device 6, the insulating layer 39 as an overcoat layer, the recording pads 18a, 18b, and the reproducing pads 19a, 19b are formed (see FIGS. 1 and 2). Subsequently, a bar in which a plurality of intermediates of perpendicular recording thin-film magnetic heads 21 are arranged in a row is cut out, and then is lapped to $S_0$ in FIG. 13, so as to form the medium-opposing surface S. Thereafter, the individual perpendicular recording thin-film magnetic heads 21 are cut out, so as to complete each perpendicular recording thin-film magnetic head 21.

The perpendicular recording thin-film magnetic head in accordance with the above-mentioned embodiment and the perpendicular recording thin-film magnetic head obtained by the method of manufacturing a perpendicular recording thin-film magnetic head in accordance with the embodiment can restrain the side erase from occurring. Namely, when emitting magnetic fluxes from the main magnetic pole layer 60 toward the magnetic recording medium 10 for writing onto the magnetic recording medium 10, those emitted from the side faces 60l of the main magnetic pole layer 60 other than the medium-opposing surface S as seen in the laminating direction are absorbed by the main magnetic pole adjacent magnetic shield layer 50 arranged such as to extend along all the side faces 60l (see FIG. 3). The magnetic fluxes emitted from the side faces 60l of the main magnetic pole layer 60 other than the medium-opposing surface S may reach tracks 10b adjacent to the track 10a to be recorded in the magnetic recording medium 10 if not for the main magnetic pole adjacent magnetic shield layer 50. Therefore, using the perpendicular recording thin-film magnetic head 21 in accordance with the embodiment reduces the magnetic fluxes emitted toward the tracks 10b adjacent to the track 10a to be recorded in the magnetic recording medium 10 at the time of writing onto the magnetic recording medium 10. As a result, the perpendicular recording thin-film magnetic head 21 suppressing the occurrence of side erase is obtained.

Further, in the perpendicular recording thin-film magnetic head 21 in accordance with this embodiment, the distance t35 between the main magnetic pole adjacent magnetic shield layer 50 and main magnetic pole layer 60 is constant in the whole area of the main magnetic pole adjacent magnetic shield layer 50 (see FIGS. 3 and 4). Therefore, the distance t35 between the main magnetic pole adjacent magnetic shield layer 50 and main magnetic pole layer 60 in the whole area of the main magnetic pole adjacent magnetic shield layer 50 is allowed to fall within a range where the main magnetic pole adjacent magnetic shield layer 50 can effectively absorb unnecessary magnetic fluxes. As a result, the perpendicular recording thin-film magnetic head 21 in accordance with this embodiment further suppresses the occurrence of side erase.

In the method of manufacturing a perpendicular recording thin-film magnetic head in accordance with this embodiment, the insulating layer 35 defining the above-mentioned distance t35 between the main magnetic pole adjacent magnetic shield layer 50 and main magnetic pole layer 60 is formed by the atomic layer deposition. The atomic layer deposition is a method which, in principle, can very uniformly form thin films atomic layer by atomic layer on the whole film-forming surface. Therefore, the distance t35 to the main magnetic pole layer 60 is very precisely constant in the whole area of the main magnetic pole adjacent magnetic shield layer 50 in the perpendicular recording thin-film magnetic head 21 obtained by the method of manufacturing a perpendicular recording thin-film magnetic head in accordance with this embodiment (see FIGS. 3 and 4). Consequently, the distance t35 between the main magnetic pole adjacent magnetic shield layer 50 and main magnetic pole layer 60 in the whole area of the main magnetic pole adjacent magnetic shield layer 50 can strictly be set so as to fall within a range where the main magnetic pole adjacent magnetic shield layer 50 can effectively absorb unnecessary magnetic fluxes. As a result, the method of manufacturing a perpendicular recording thin-film magnetic head in accordance with this embodiment yields the perpendicular recording thin-film magnetic head 21 further suppressing the occurrence of side erase.

The perpendicular recording thin-film magnetic head 21 in accordance with the above-mentioned embodiment further comprises a pair of side shield layers 55 extending along the medium-opposing surface S such as to hold therebetween the tip main magnetic pole part 60a by way of the nonmagnetic layer 35 in the track width direction (see FIG. 4). Therefore, the magnetic fluxes emitted from the side faces 60l of the main magnetic pole layer 60 other than the medium-opposing surface S can be absorbed by both of the main magnetic pole adjacent magnetic shield layer 50 and side shield layers 55. As a result, the perpendicular recording thin-film magnetic head 21 in accordance with the embodiment further suppresses the occurrence of side erase.

In the perpendicular recording thin-film magnetic head 21 in accordance with the above-mentioned embodiment, the return yoke 68 is provided on the trailing side of the main magnetic pole layer 60 (see FIG. 2). This allows the return yoke 68 to have a function as a trailing shield. As a result, the magnetic fluxes emitted from the main magnetic pole layer 60 can be restrained from spreading to the trailing side, whereby the perpendicular recording thin-film magnetic head 21 in accordance with this embodiment can adapt to a high linear recording density.

Figure 16:
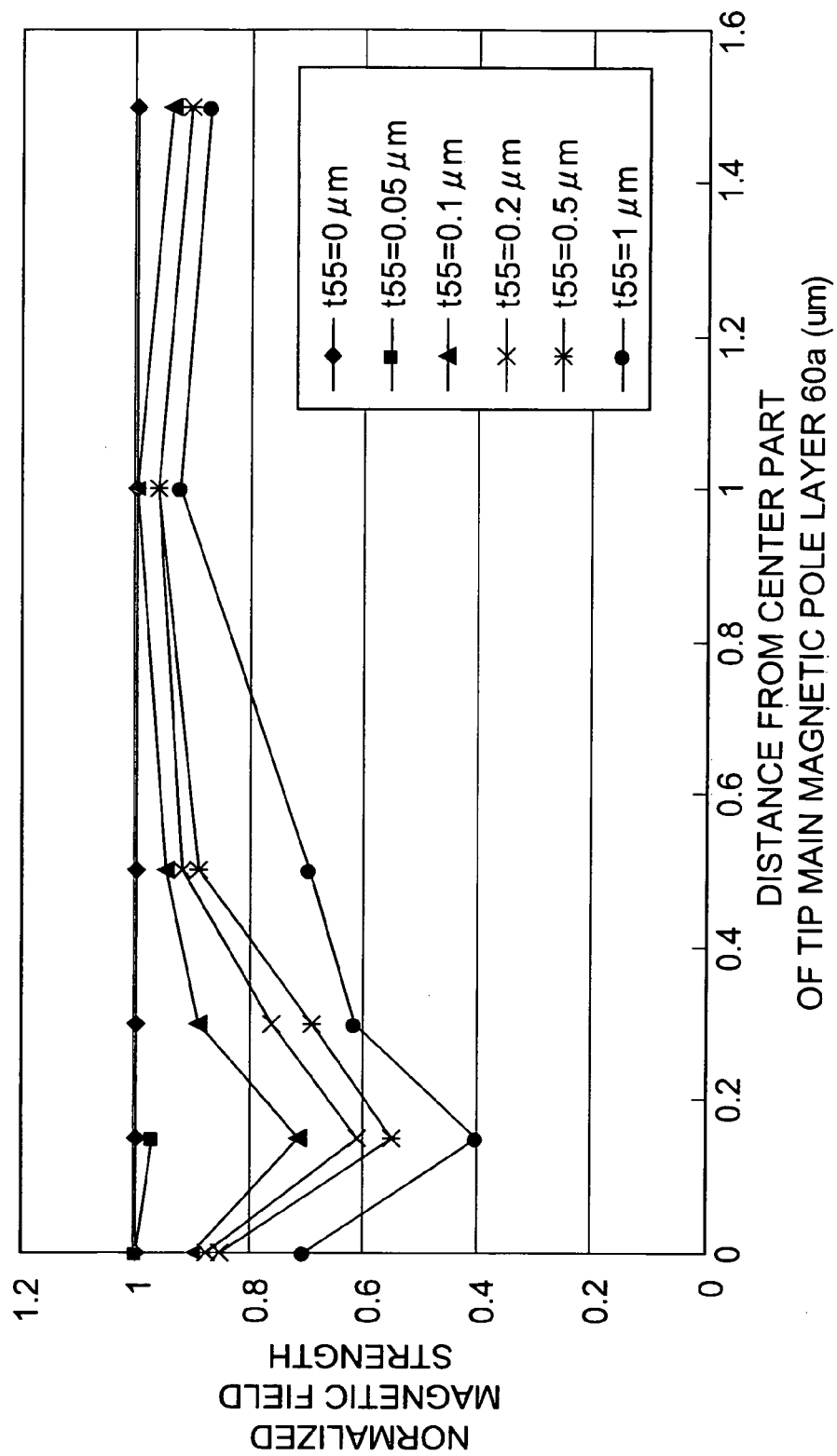

For further clarifying effects of the present invention, the following simulations were conducted. In FIG. 16, the magnitude of t55 in FIG. 3 is used as a parameter, the abscissa indicates the distance in the track width direction from the center part of the tip main magnetic pole layer 60a in the medium-opposing surface S, and the ordinate indicates the magnetic field strength on the medium-opposing surface S corresponding to each distance as normalized with the magnetic field strength at the same distance in the case where t55 is 0. The value of t35 (see FIG. 4) was all set to 0.06 μm. FIG. 16 shows that, when t55 is within the range of 0.1 to 0.5 μm, magnetic fields directly under the tip main magnetic pole layer 60a are hardly absorbed, whereas magnetic fields generated from areas on the periphery of the tip main magnetic pole layer 60a are effectively absorbed.

Figure 17:
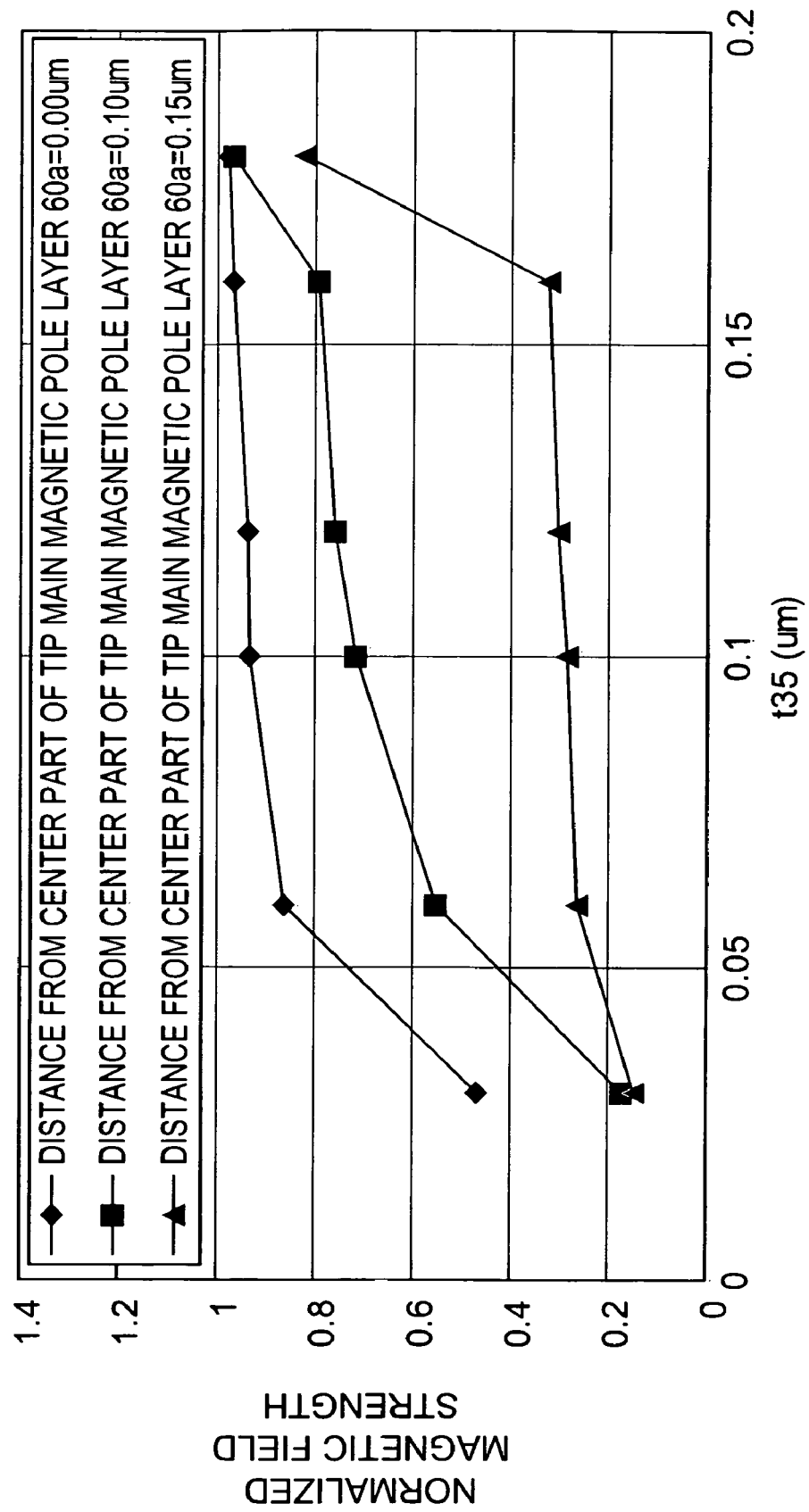
FIG. 17 is a graph showing characteristics of normalized magnetic field strength vs. t35.

In FIG. 17, the distance in the track width direction from the center part of the tip main magnetic pole layer 60a on the medium-opposing surface S is used as a parameter, the abscissa indicates the magnitude of t35 in FIG. 4, and the ordinate indicates the magnetic field strength on the medium-opposing surface S corresponding to each distance as normalized with the magnetic field strength in the case where t35 is at infinity (i.e., there is no main magnetic pole adjacent magnetic shield layer 50). The value of t55 (see FIG. 3) was all set to 0.1 μm. FIG. 17 shows that, when t35 is within the range of 0.06 to 0.16 μm, magnetic fields directly under the tip main magnetic pole layer 60a are hardly absorbed, whereas magnetic fields generated from areas on the periphery of the tip main magnetic pole layer 60a are effectively absorbed.

The present invention can be modified in various ways without being restricted to the above-mentioned embodiments.

Figure 14:
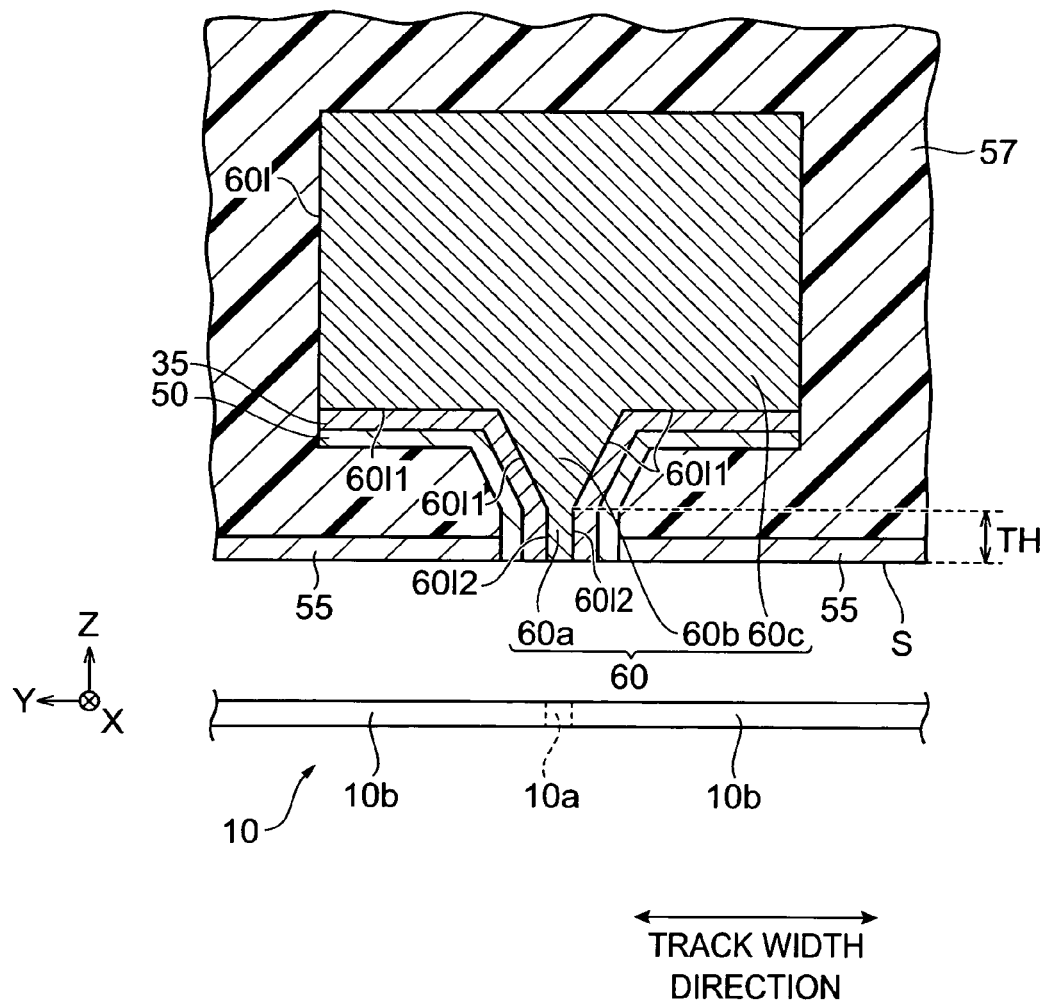
FIG. 14 is a sectional view of a modified example of the perpendicular recording thin-film magnetic head 21.

For example, the magnetic pole adjacent magnetic shield layer 50 is not limited to the form shown in FIG. 3. For example, as shown in FIG. 14, the main magnetic pole adjacent magnetic shield layer 50 may be provided along side faces 60/2 of the tip main magnetic pole part 60a and side faces 60/1 which are side faces of the middle main magnetic pole part 60b and rear main magnetic pole part 60c on the medium-opposing surface S side in the side faces 60l of the main magnetic pole layer 60 other than the medium-opposing surface S. Magnetic fluxes emitted from the side faces 60/2 of the tip main magnetic pole part 60a and the side faces 60/1, which are side faces of the middle main magnetic pole part 60b and rear main magnetic pole part 60c on the medium opposing surface S side, will be likely to reach the tracks 10b adjacent to the track 10a to be recorded in the magnetic recording medium 10 if not for the main magnetic pole adjacent magnetic shield layer 50. Therefore, the perpendicular recording thin-film magnetic head 21 in such a mode can also sufficiently suppress the occurrence of side erase.

Figure 15:
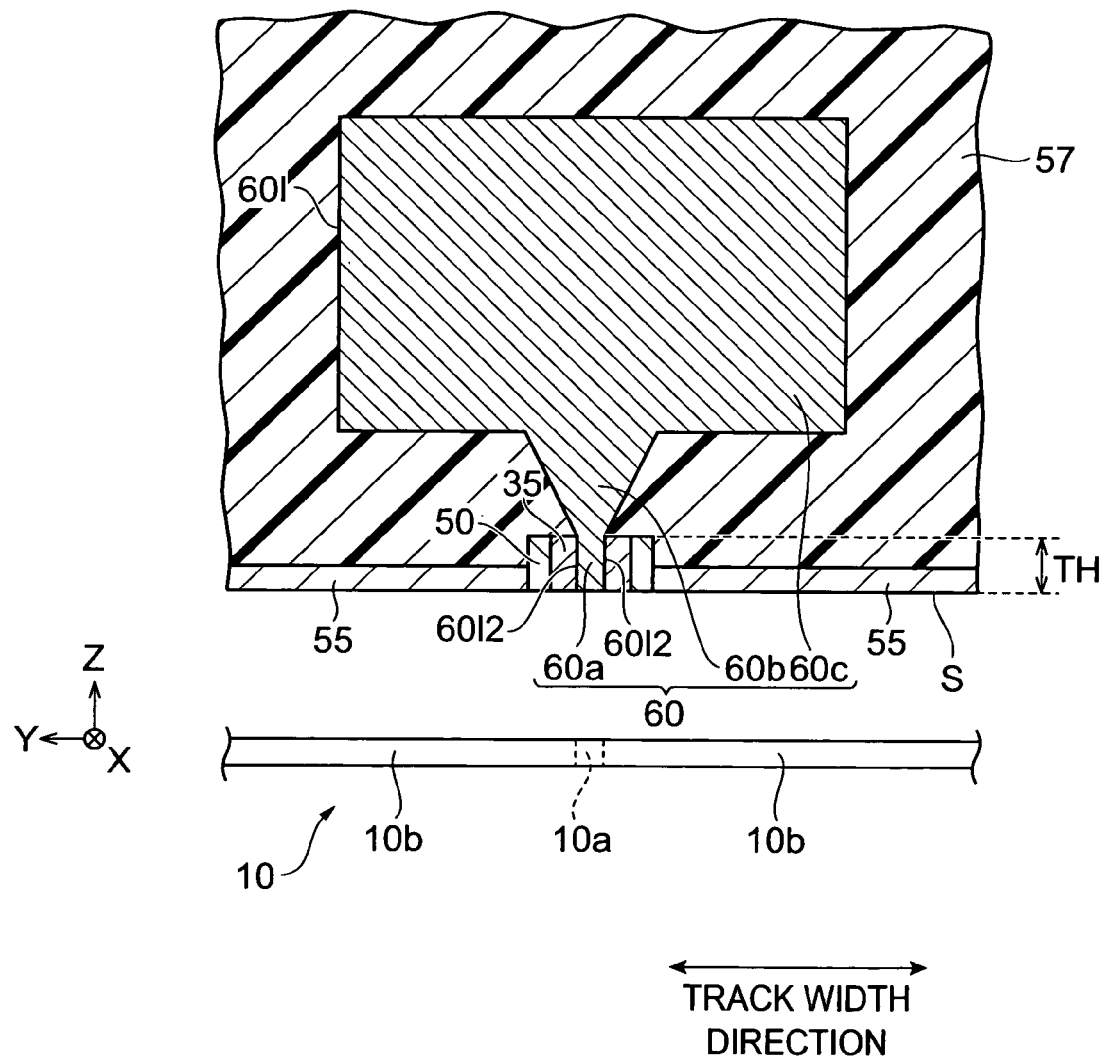
FIG. 15 is a sectional view of a modified example of the perpendicular recording thin-film magnetic head 21.

As shown in FIG. 15, the main magnetic pole adjacent magnetic shield layer 50 may be provided along only the side faces 60/2 of the tip main magnetic pole part 60a in the side faces 60l of the main magnetic pole layer 60 other than the medium-opposing surface S. In the side faces 60l of the main magnetic pole layer 60 other than the medium-opposing surface S, the side faces 60/2 of the tip main magnetic pole part 60a are located closer to the magnetic recording medium 10, whereby magnetic fluxes emitted from the side faces 60/2 of the tip main magnetic pole part 60a will be likely to cause the side erase if not for the main magnetic pole adjacent magnetic shield layer 50 in particular. Therefore, the perpendicular recording thin-film magnetic head 21 in such a mode can also sufficiently suppress the occurrence of side erase.

Though the return yoke 68 is provided on the trailing side of the main magnetic pole layer 60 in the perpendicular recording thin-film magnetic head 21 in accordance with the above-mentioned embodiment (see FIG. 2), the positional relationship between the return yoke 68 and main magnetic pole layer 60 may be reversed.

The perpendicular recording thin-film magnetic head 21 may be free of the side shield layers 55.

The main magnetic pole layer 60 and return yoke layer 68 are magnetically separated from each other in the medium-opposing surface S in the above-mentioned embodiment (see FIG. 4), but may be magnetically coupled to each other.

Though a leading shield layer may further be provided between the insulating layer 35 and interdevice magnetic shield layer 38, the perpendicular recording thin-film magnetic head 21 in accordance with the embodiment is effective in particular when there is no leading shield layer.

What is claimed is:

1. A perpendicular recording thin-film magnetic head comprising:
   a main magnetic pole having a tip main magnetic pole part extending in a height direction from a medium-opposing surface and a base main magnetic pole part connected to the tip main magnetic pole part on a side opposite from the medium-opposing surface side and wider than the tip main magnetic pole part in a track width direction;
   a return yoke extending in the height direction from the medium-opposing surface and magnetically coupling with the base main magnetic pole part at a position distanced from the medium-opposing surface in the height direction, while opposing the tip main magnetic pole part through a write gap layer in a bit length direction in the medium- opposing surface;

a main magnetic pole adjacent magnetic shield layer extending along at least part of side faces of the main magnetic pole other than a medium-opposing surface of the tip main magnetic pole part as seen in a laminating direction, while holding a nonmagnetic layer between the main magnetic pole and the main magnetic pole adjacent magnetic shield layer;

a pair of side shield layers extending along the medium-opposing surface so as to hold the tip main magnetic pole part by way of the nonmagnetic layer in the track width direction, wherein the main magnetic pole adjacent magnetic shield layer extends along at least a side face of the tip main magnetic pole part in the side faces of the main magnetic pole other than the medium-opposing surface of the tip main magnetic pole part, and the length of the main magnetic pole adjacent magnetic shield layer in the height direction is greater than the length of the side shield layers in the height direction.

2. A perpendicular recording thin-film magnetic head according to claim 1, wherein the main magnetic pole adjacent magnetic shield layer extends along at least the side face of the tip main magnetic pole part and a side face of the base main magnetic pole part on the medium-opposing surface side in the side faces of the main magnetic pole other than the medium-opposing surface of the tip main magnetic pole part.

3. A perpendicular recording thin-film magnetic head according to claim 2, wherein the main magnetic pole adjacent magnetic shield layer extends along all the side faces of the main magnetic pole other than the medium-opposing surface of the tip main magnetic pole part.

4. A perpendicular recording thin-film magnetic head according to claim 1, wherein the main magnetic pole adjacent magnetic shield layer and the main magnetic pole have a constant distance therebetween in the whole area of the main magnetic pole adjacent magnetic shield layer.

5. A perpendicular recording thin-film magnetic head according to claim 1, wherein the return yoke is provided on the trailing side of the main magnetic pole part.

6. A method of manufacturing the perpendicular recording thin-film magnetic head according to claim 1, the method comprising:

a main magnetic pole forming step of forming the main magnetic pole having the tip main magnetic pole part extending in the height direction from a surface to be formed with the medium-opposing surface and the base main magnetic pole part connected to an end face in the height direction of the tip main magnetic pole part and wider than the tip main magnetic pole part in the track width direction; and a main magnetic pole adjacent magnetic shield layer forming step of forming the main magnetic pole adjacent magnetic shield layer extending along at least part of a side face in an area on the base main magnetic pole part side of the surface to be formed with the medium-opposing surface of the main magnetic pole when seen in the laminating direction, while holding the nonmagnetic layer between the main magnetic pole and the main magnetic pole adjacent magnetic shield layer.

7. A method of manufacturing the perpendicular recording thin-film magnetic head according to claim 6, wherein, in the main magnetic pole adjacent magnetic shield layer forming step, the nonmagnetic layer is formed such that the main magnetic pole adjacent magnetic shield layer and the main magnetic pole have a constant distance therebetween in the whole area of the main magnetic pole adjacent magnetic shield layer.

8. A method of manufacturing the perpendicular recording thin-film magnetic head according to claim 7, wherein, in the main magnetic pole adjacent magnetic shield layer forming step, at least part of the nonmagnetic layer is formed by atomic layer deposition.

9. A perpendicular recording thin-film magnetic head according to claim 1, wherein the main magnetic pole adjacent magnetic shield layer is in contact with the side shield layers.

* * * * *